United States Patent [19]

Pèveraro

[11] 3,826,197
[45] July 30, 1974

[54] TRACKED VEHICLE SYSTEM
[75] Inventor: Cèsare Pèveraro, Milan, Italy
[73] Assignee: Societa' Per La Strada Guidata S.r.L., Milano, Italy
[22] Filed: Mar. 19, 1973
[21] Appl. No.: 342,358

[30] Foreign Application Priority Data
Mar. 21, 1972 Italy..................................... 9406/72

[52] U.S. Cl................................ 104/130, 246/434
[51] Int. Cl............................................. E01b 25/12
[58] Field of Search ............ 104/130, 131; 246/375, 246/379, 415, 434

[56] References Cited
UNITED STATES PATENTS
| | | | |
|---|---|---|---|
| 2,977,893 | 4/1961 | Rosenbaum | 104/130 |
| 3,098,454 | 7/1963 | Maestrelli | 104/130 |
| 3,119,349 | 1/1924 | Hampton et al. | 104/130 |
| 3,593,668 | 7/1971 | Adams | 104/130 |
| 3,628,462 | 12/1971 | Holt | 104/130 |
| 3,661,091 | 5/1972 | Noble | 104/130 |

Primary Examiner—M. Henson Wood, Jr.
Assistant Examiner—Richard A. Bertsch
Attorney, Agent, or Firm—Sandoe, Hopgood & Calimafde

[57]     ABSTRACT

A crossover network interposed between two track portions of a tracked vehicle system each having to tracks, comprises a first resilient wheel-guiding tongue aligned with one of the tracks of one track portion, and a second resilient wheel-guiding tongue aligned with the other of the tracks of the other track portion. When the tongues are deflected by a lateral force one of the resilient tongues is aligned with a rigid wheel-guiding tongue, and the other resilient tongue is parallel to the rigid tongue whereby a wheeled vehicle is switched from one track to the other track.

4 Claims, 3 Drawing Figures

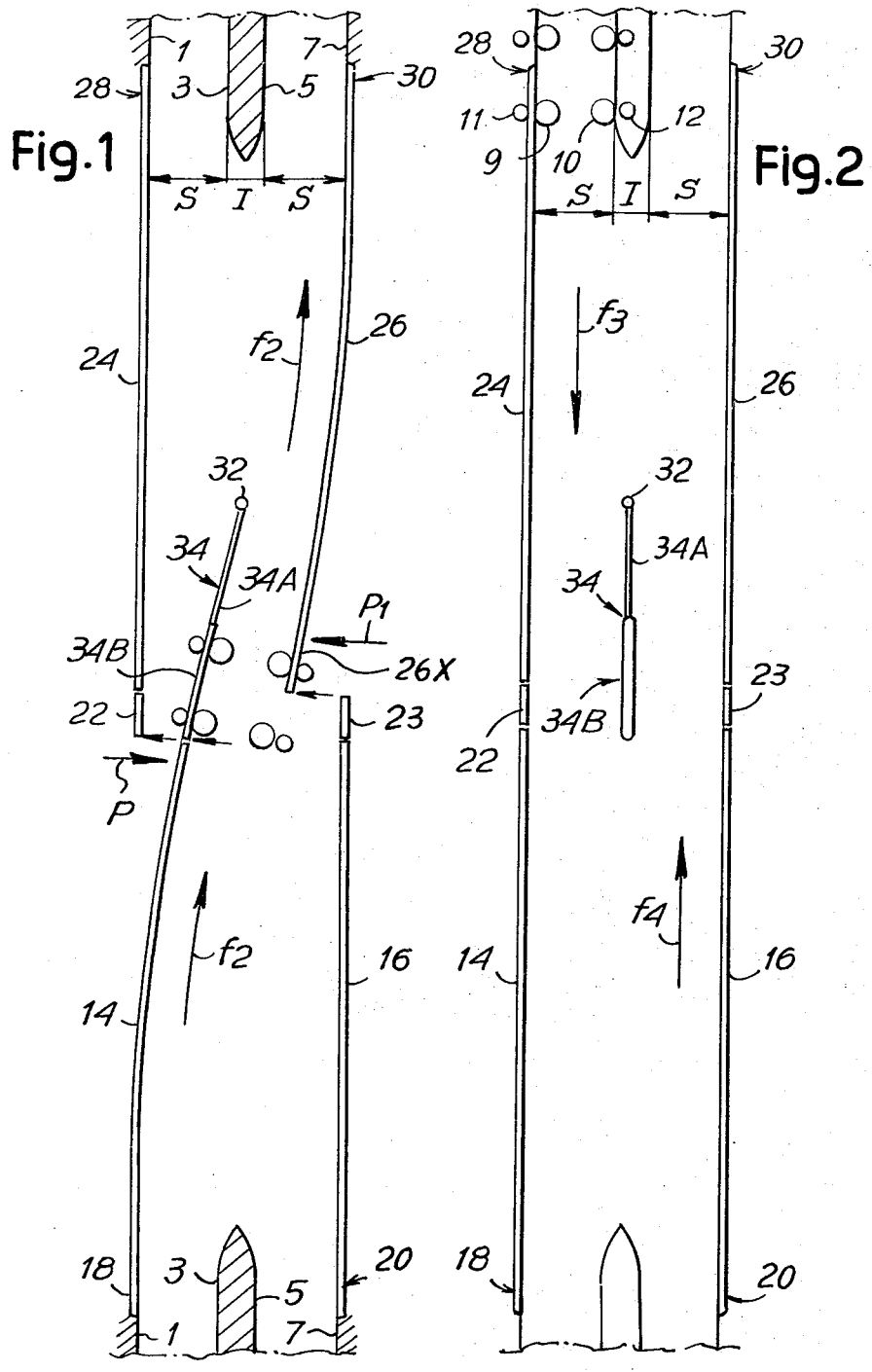

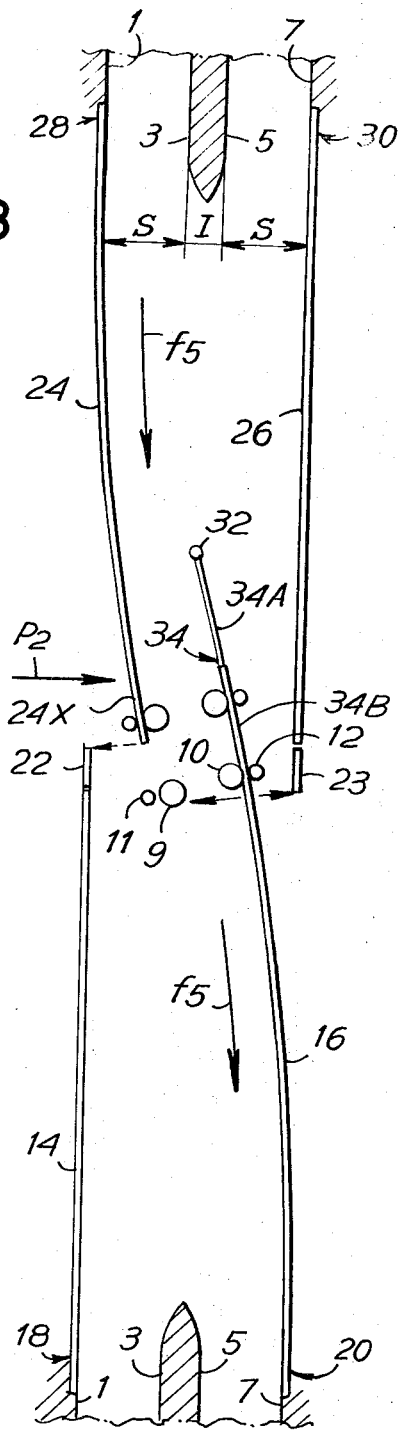

TRACKED VEHICLE SYSTEM

BACKGROUND OF THE INVENTION

1. Field of the Invention

The invention relates to track systems and more particularly to track systems for vehicles as described in U.S. Pat. Nos. 3,113,529 and 3,098,454; British Pat. No. 940,782; and German Pat. Nos. 1,294,405 and 1,116,081.

2. Description of the Prior Art

In the aforementioned Patent Specifications, there is described a vehicle which is guided by means of inner and outer sets of wheels which rotate about a vertical axis and which are arranged to respectively engage the opposed inner surfaces of two rails, and the outer surfaces of the rails. To effect guiding, either the inner wheels engage the inner surfaces of the two rails, or an inner wheel and an outer wheel engage the inner and outer surfaces of one rail.

SUMMARY OF THE INVENTION

According to the present invention, there is provided in a track system for a vehicle guided by the engagement of wheels selectively with facing surfaces of track means or with inner and outer surfaces of track means at one side of the vehicle, a first track portion, and a second track portion, each said track portion having first track means, and second track means, each said track means including an outer guiding wall, a crossover network interposed between the first and second track portions, said crossover network comprising a first resilient guiding tongue aligned with the outer guiding wall of the first track means of the first track portion, the said tongue being deformable by the application of a lateral force, and the said first tongue having inner and outer wheel-guiding surfaces, a second resilient guiding tongue aligned with the outer guiding wall of the second track means of the second track portion, the said second tongue being deformable by the application of a lateral force, and the said second tongue having inner and outer wheel-guiding surfaces, and a rigid guiding tongue interposed between the first and second track means, the said rigid tongue having inner and outer wheel-guiding surfaces and being movable into a neutral position in which in an undeformed condition of the resilient tongues a vehicle can pass from one said track means of one said track portion to the corresponding track means of the other said track portion, and into an inclined position in which, in a deformed condition of the resilient tongues, the rigid tongue is aligned with one of the resilient tongues and lies at one side of the other resilient tongue whereby a vehicle can pass from one said track means of one said track portion to the other track means of the other said track portion, the aligned tongues guiding the vehicle on one side and the other tongue guiding the vehicle on the other side.

BRIEF DESCRIPTION OF THE DRAWINGS

An embodiment of the invention will now be described, by way of example only, with reference to the accompanying diagrammatic drawings, in which:

FIG. 1 is a plan view of a crossover network for a track system in accordance with the invention, the crossover network being shown in a first switched position;

FIG. 2 is a plan view of the crossover network in a neutral position; and

FIG. 3 is a plan view of the crossover network in a second switched position.

DESCRIPTION OF THE PREFERRED EMBODIMENTS

As shown in the drawings, a track system comprises a switch or crossover network interposed between two track portions. Each track portion comprises two tracks formed by rails having opposed side walls 1 and 3, and 5 and 7 respectively. A tired vehicle movable along the track has guide or steering wheels 9 and 10 in engagement with the inner surfaces of the rails. Alternatively the vehicle can be guided by a wheel 9 or 10 in engagement with the inner surfaces of one side wall, and a wheel 11 or 12 in engagement with the outer surface of that side wall, the wheels 11 and 12 being arranged at a higher level than the wheels 9 and 10.

The crossover network is movable into a first switched position (FIG. 1) to permit switching of a vehicle from one track to the other track when moving in one direction, into a second switched position (FIG. 3) to permit switching of a vehicle between the tracks when moving in the opposite direction, and into a neutral position (FIG. 2) in which a vehicle is maintained on the same track.

In the first switched position (FIG. 1) there is provided a vehicle path according to the arrows $f2$ from the left hand portion (as viewed in the drawing) of one track (hereinafter termed the "first" track) to the right hand portion of the other track (hereinafter termed the "second" track, or viceversa. In the neutral position of the network (FIG. 2) paths are provided according to the arrows $f3$ and $f4$ (either in the direction of the arrows or in the opposite direction) for the undeviated passage of a vehicle along the two tracks. In the second switched position of the network (FIG. 3), there is provided a vehicle path in the direction of the arrows $f5$ (or in the opposite direction) between the two tracks.

The crossover network includes a pair of resilient tongues 14, 16 aligned with the outer walls 1 and 7 respectively of the left-hand portion of the first and second tracks. The resilient tongues 14 and 16 are fixed at points 18 and 20, these fixing points are located before the end of the side walls 3 and 5. The two resilient tongues 14 and 16 can be deformed periodically by the application of a force, for example as indicated by P on the tongue 14 in FIG. 1, at the free end portion of the respective tongue. In an equilibrium position of each tongue 14 and 16 as shown in FIG. 2 for both tongues, in FIG. 1 for the tongue 16 only and in FIG. 3 for the tongue 14 only, the free end of the tongue 14 or 16 is aligned with a short fixed wall section 22 or 23 respectively.

On the opposite side of the network, resilient tongues 24 and 26 are provided. The tongues 24 and 26 are aligned with the outer walls 1 and 7 of the right-hand portion of the tracks, the tongues 24 and 26 being fixed at 28 and 30 to the walls 1 and 2. The tongues 24 and 26 are deflectable by forces indicated by $P_1$ (FIG. 1) for the tongue 26 and $P_2$ (FIG. 3) for the tongue 24. These forces act at a fixed distance from the free end of the tongue. The length of the fixing portions 28 and 30 corresponds to the length by which the side walls 3 and 5 at the right-hand portion of the track extend beyond the side walls 1 and 7.

At a point 32 on the axis of symmetry between the two tracks, there is pivoted a rigid tongue 34 comprising a section 34A adjacent to the pivot 32 and an end section 34B. The section 34A is sufficiently low so as not to engage the guiding wheel of a vehicle. The section 34B forms a guide wall, the end of the section 34B being parallel to both walls 24, 26 in the neutral position of the network. The forces $P_1$ (FIG. 1) and $P_2$ (FIG. 3) which act on the resilient tongues 26 and 24, act along a line extending approximately through the junction of the sections 34A and 34B of the rigid tongue 34. The portion of each resilient tongue 24 and 26 between its free end and the point of application of the force $P_2$ and $P_1$ respectively, remains undeformed (and therefore rectilinear), when the respective force is applied in the tongue. The rigid tongue 34 is movable in a switched position of the network through such an angle from its neutral position parallel to the walls 1, 3, 5 and 7 (FIG. 2) that its end section 34B is essentially parallel with the undeformed end portion of the resilient tongue 24 or 26 to which a force is applied. In the first switched position of the network (FIG. 1) the force $P_1$ is applied to the tongue 26 (tongue 24 remaining undeformed), the rigid tongue 34 being moved so that its end section 34B is parallel with the free end portion of the tongue 26. In the second switched position of the network (FIG. 3) the force $P_2$ is applied to the tongue 26 and the tongue 34 is moved so that its end section 34B is parallel with the free end portion 24X of the tongue 24.

Application of a force P to the end of either of the tongues 16 and 14 causes the tongue to be deformed over substantially the entire length of the tongue.

Suitable means shown are provided to control the resilient deformation of the tongues 14 and 26, or 16 and 24, and corresponding pivotal movement of the rigid tongue 34. In the neutral position (FIG. 2) the rigid tongue 34 is retained in its central position, the tongues 14 and 24 together with the fixed wall 22 linking the walls 1 of the two track portions of the first track, and the tongues 16 and 26 together with the fixed wall 23 linking the walls 7 of the two track portions of the second track. Suitable locking means (not shown) serve to stabilize the arrangement of FIG. 2.

With the five described tongues (of which four are resilient and one is rigid), four vehicle paths are provided namely two direct and parallel paths and two paths crossing over between the two tracks. In the first switched position (FIG. 1) for example, the resilient tongue 14 is deformed parabolically by the action of the force P at its free end so as to be aligned with the section 34B of the rigid tongue 34. The action of the force $P_1$ on the tongue 26 deforms the tongue 26 parabolically between the fixing 30 and the point of application of the force $P_1$, while the end portion 26X remains rectilinear and extends parallel to the section 34B of the rigid tongue 34. Consequently, a vehicle located on the first track and, passing over the crossover network in the direction of the arrows $f2$ is initially guided at its left-hand side by the tongue 14 and then by the section 34B of the tongue 34. Immediately afterwards the right-hand guiding wheels of the vehicle engage the end portion 26X of the tongue 26 and thereafter the vehicle continues to be guided by the tongue 26 to reach the right-hand portion of the track. It will be appreciated that a vehicle may pass in the opposite direction from the right-hand portion of the second track to the left-hand portion of the first track.

In the second switched position of the network (FIG. 3) a vehicle passing over the network in the direction of the arrows $f5$ from the right-hand portion of the first track, is guided on its right-hand side by the deformed resilient tongue 24 with its straight end section 24X. The vehicle then engages, at its left-hand side, the section 34B of the tongue 34. The vehicle is then guided by the resilient tongue 16 and reaches the left-hand portion of the second track; the vehicle can, of course, pass in the opposite direction over this path.

In the neutral position of the network (FIG. 2), the tongue 34 is in a central position and a vehicle passes undeviated along the first or second track, the vehicle being guided by an outer continuous wall formed by the elements 14, 22, 24 or 16, 23, 26 respectively.

The embodiment described provides a simple crossover network arrangement in which the distance I (FIGS. 1 to 3) between the inner side walls of the tracks, is in essence, independent of the gauges of the track. Thus the transverse dimension S+I+S is kept to a minimum, whereby the width of tunnels, viaducts and the like associated with the track system can be kept to a minimum. Suitably, for a standard gauge track, the length of the resilient tongues can be of the order of 20 metres.

What is claimed is:

1. In a track system for a vehicle guided by the engagement of wheels selectively with facing surfaces of track means or with inner and outer surfaces of track means at one side of the vehicle, a first track portion, and a second track portion, each said track portion having first track means, and second track means, each said track means including an outer guiding wall, a crossover network interposed between the first and second track portions, said crossover network comprising a first resilient guiding tongue aligned with the outer guiding wall of the first track means of the first track portion, the said first tongue being deformable by the application of a lateral force, and the said first tongue having inner and outer wheel-guiding surfaces, a second resilient guiding tongue aligned with the outer guiding wall of the second track means of the second track portion, the said second tongue being deformable by the application of a lateral force, and the said second tongue having inner and outer wheel-guiding surfaces, and a rigid guiding tongue interposed between the first and second track means, said rigid tongue having inner and outer wheel-guiding surfaces and being movable into a neutral position in which in an undeformed condition of the resilient tongues a vehicle can pass from one said track means of one said track portion to the corresponding track means of the other said track portion, and into an inclined position in which, in a deformed condition of the resilient tongues, the rigid tongue is aligned with one of the resilient tongues, and lies at one side of the other resilient tongue whereby a vehicle can pass from one said track means of one said track portion to the other track means of the other said track portion, the aligned tongues guiding the vehicle on one side, and the other tongue guiding the vehicle on the other side.

2. A track system as claimed in claim 1, wherein each said resilient tongue has a free end, and the first resilient tongue is deformed by said lateral force applied at its free end, and the second resilient tongue is deformed by a said lateral force applied at a point spaced from the free end whereby the free end portion of the second tongue extends parrallel to the rigid tongue when the second tongue is deformed.

3. A track system as claimed in claimed in claim 1, wherein the rigid tongue is pivotally mounted and comprises a guiding portion, and
a non-guiding portion, said non-guiding portion lying between the pivotal axis of the tongue and the guiding portion.

4. A track system as claimed in claim 1, comprising two said first resilient tongues each aligned with a respective outer guiding wall of the first and second track means of the first track portion, and two said second resilient tongues each aligned with a respective outer guiding wall of the first and second track means of the second track portion, the first and second tongues being symmetrical about the centre line between the first and second track means, and the rigid tongue being movable into two inclined positions.

* * * * *